United States Patent
Chuang et al.

(10) Patent No.: US 9,621,485 B2
(45) Date of Patent: Apr. 11, 2017

(54) SHARED INTERFACE CIRCUIT

(71) Applicant: Wistron NeWeb Corp., Hsinchu (TW)

(72) Inventors: Chung-Hua Chuang, Hsinchu (TW); Chun-Muh Tsai, Hsinchu (TW)

(73) Assignee: Wistron Neweb Corp., Hsinchu (TW)

( * ) Notice: Subject to any disclaimer, the term of this patent is extended or adjusted under 35 U.S.C. 154(b) by 67 days.

(21) Appl. No.: 14/858,486

(22) Filed: Sep. 18, 2015

(65) Prior Publication Data

US 2016/0234131 A1    Aug. 11, 2016

(30) Foreign Application Priority Data

Feb. 11, 2015  (TW) .............................. 104104511 A

(51) Int. Cl.
*H04L 12/931*    (2013.01)
(52) U.S. Cl.
CPC .................... *H04L 49/40* (2013.01)
(58) Field of Classification Search
CPC ...................................................... H04L 49/40
See application file for complete search history.

(56) References Cited

U.S. PATENT DOCUMENTS

2004/0221294 A1*  11/2004  Kalmuk ................. G06F 9/544
                                                    719/312

FOREIGN PATENT DOCUMENTS

| CN | 100378622 C | 4/2008 |
| TW | 594544 B | 6/2004 |
| TW | 200708036 A | 2/2007 |
| TW | 200923657 A | 6/2009 |

* cited by examiner

*Primary Examiner* — Jianye Wu
(74) *Attorney, Agent, or Firm* — Muncy, Geissler, Olds & Lowe, P.C.

(57) ABSTRACT

The present invention provides a circuit including a multiplexer, a level-shifter circuit, a power-supply circuit, and a switch circuit. The multiplexer has a first input-terminal, a second input-terminal and a third input-terminal, wherein the first and second input-terminals are coupled to a first-interface pin and a second-interface transfer pin of a processor, and the third input-terminal is coupled to a second-interface receive pin or the first-interface pin of the processor. The level shifter circuit converts signals on the second input-terminal of the multiplexer and the signal receiving terminal of a shared-socket. The power-supply circuit couples a first power-source to the signal outputting terminal. The switch circuit couples the signal receiving terminal of the shared-socket to the third input-terminal of the multiplexer.

17 Claims, 8 Drawing Sheets

SHARED INTERFACE CIRCUIT

CROSS REFERENCE TO RELATED APPLICATIONS

This Application claims priority of Taiwan Patent Application No. 104104511, filed on Feb. 11, 2015, the entirety of which is incorporated by reference herein.

BACKGROUND OF THE INVENTION

Field of the Invention

The present invention is related to a shared interface circuit; in particular to a shared interface circuit which have two different voltage levels.

Description of the Related Art

Presently, electronic devices are highly advanced and multi-functional. For example, electronic devices such as mobile phones and laptops are capable of conducting telecommunications, receiving and transmitting e-mails, maintaining social networks, managing contacts, and playing media. Consumer demand calls for servers and other Internet sharing devices to have higher specifications.

Among the many specifications, the size of electronic devices is one major problem. Due to this aspect of the specifications, the problem that needs to be solved is how to decrease the amount of interfaces on the electronic device while maintaining a certain amount of functionality.

BRIEF SUMMARY OF THE INVENTION

A detailed description is given in the following embodiments with reference to the accompanying drawings.

An exemplary embodiment provides a shared interface circuit. The shared interface circuit includes a shared socket, a multiplexer, a level shifter circuit, a power supply circuit, and a switch circuit. The shared socket has a slot, a reference terminal, a control terminal, a signal receiving terminal and a signal outputting terminal. The multiplexer has a first input terminal, a second input terminal and a third input terminal, wherein the first input terminal is arranged to be selectively coupled to a first-interface pin of a processor according to a control signal, the second input terminal is arranged to be selectively coupled to a second-interface transfer pin of the processor according to the control signal, and the third input terminal is arranged to be selectively coupled to a second-interface receive pin and the first-interface pin of the processor according to the control signal. The level shifter circuit is arranged to convert signals on the second input terminal of the multiplexer from a first voltage level to a second voltage level and convert signals on the signal receiving terminal of the shared socket from the second voltage level to the first voltage level, wherein the level shifter circuit is further arranged to selectively transmit the converted signals on the control terminal of the multiplexer to the signal outputting terminal of the shared socket according to the control signal, and selectively transmit the converted signals on the signal receiving terminal of the shared socket to the third input terminal of the multiplexer according to the control signal. The power supply circuit is arranged to selectively couple a first power source to the signal outputting terminal according to the control signal. The switch circuit is arranged to selectively couple the signal receiving terminal of the shared socket to the third input terminal of the multiplexer according to the control signal.

Another exemplary embodiment provides a shared interface circuit applicable to a first-interface plug and a second interface plug meeting a first interface specification and a second interface specification, respectively. The shared interface circuit includes a shared socket having a slot, a level shifter circuit, a multiplexer and a processor. The shared socket has a slot, a control terminal, a reference terminal, and a signal receiving terminal generating an input signal, wherein the control terminal is electrically connected to the reference terminal when the first-interface plug is inserted into the slot, and the control terminal is electrically separated with the reference terminal when the second interface plug is inserted into the slot, wherein a control signal is generated by the voltage differences between the reference terminal and the control terminal. The level shifter circuit is coupled to the shared socket adapted to be operated for converting the input signal to another voltage level according to the control signal. The multiplexer is coupled to the level shifter circuit, receiving the converted input signal and being operated according to the control signal. The processor is coupled to the multiplexer, the processor having a plurality of input terminals connected to the multiplexer, wherein the converted signal is selectively transmitted to one of the input terminal via the multiplexer according to the control signal.

BRIEF DESCRIPTION OF THE DRAWINGS

The present invention can be more fully understood by reading the subsequent detailed description and examples with references made to the accompanying drawings, in which.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
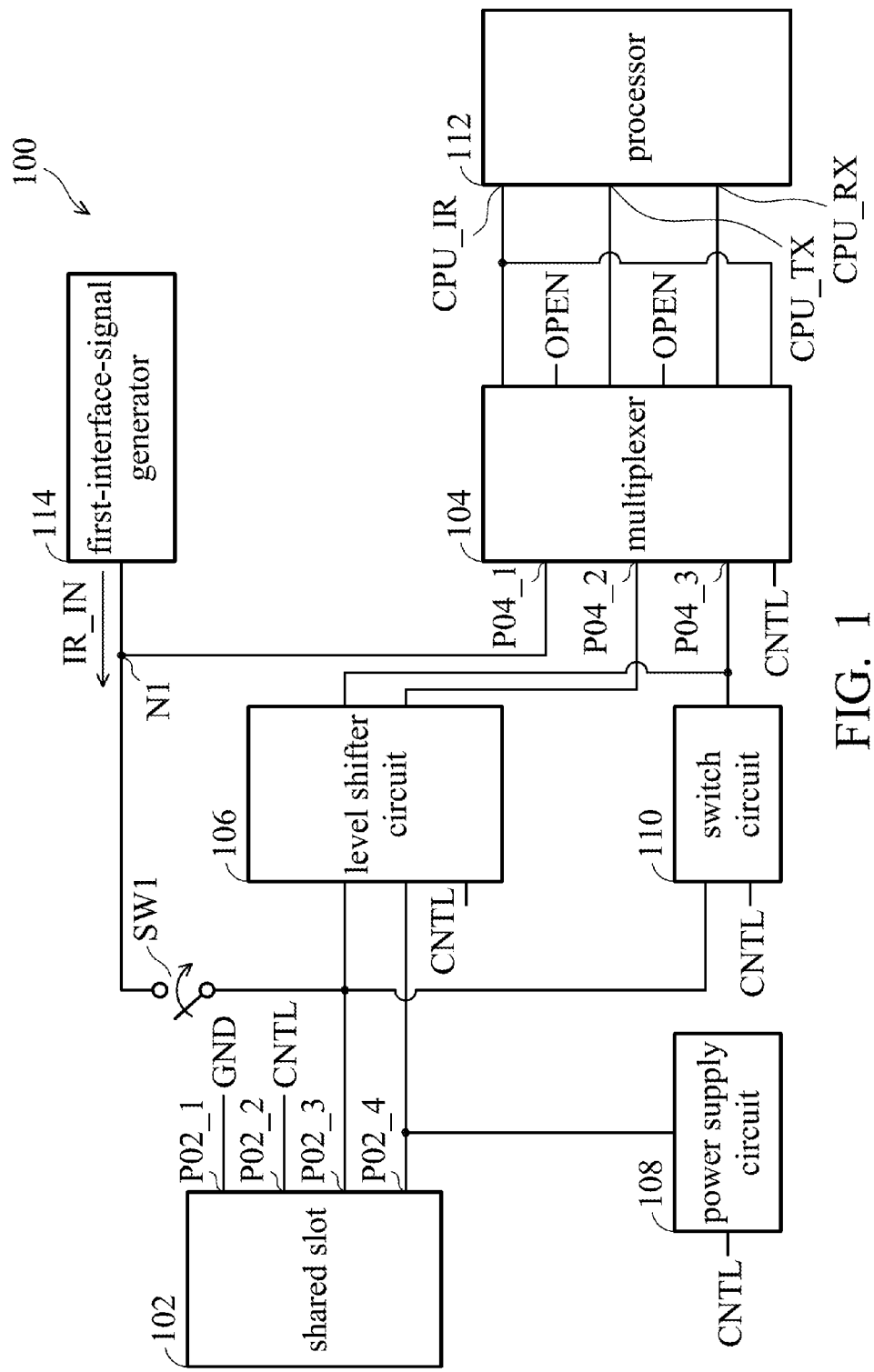
FIG. 1 is a schematic diagram illustrating an embodiment of a shared interface circuit of an exemplary embodiment.

FIG. 1 is a schematic diagram illustrating an embodiment of a shared interface circuit of an exemplary embodiment. The shared interface circuit 100 includes a shared socket 102, a multiplexer 104, a level shifter circuit 106, a power supply circuit 108, a switch circuit 110, a first-interface-signal generator 114, and a first switch SW1. A person skilled in the art may also implement the shared interface circuit 100 on a computer configuration with a touch interface, such as a hand-held device, a portable device, a personal digital assistant, a processing unit system, and microprocessor-based or programmable consumer electronics. In one embodiment, the shared interface circuit 100 can be implemented in a set-top box, such as an MOD set-top box, or another electronic device having an infrared sensing function, but it is not limited thereto.

Figure 2B:
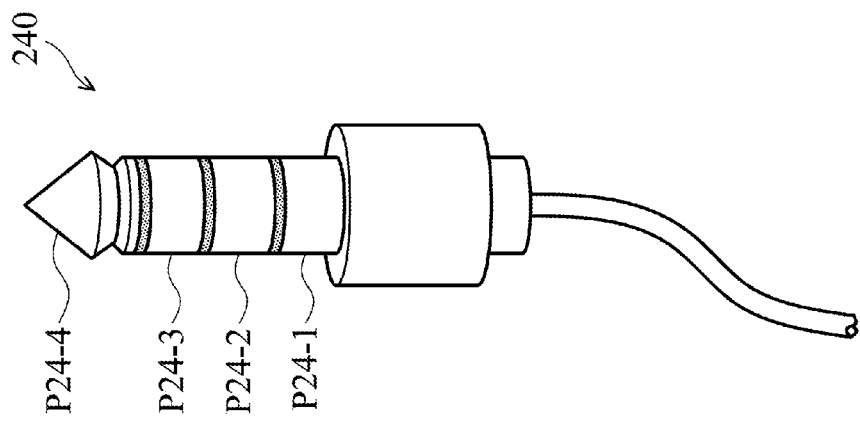
FIG. 2B is a schematic diagram illustrating an embodiment of a second-interface plug of an exemplary embodiment.
Figure 2A:
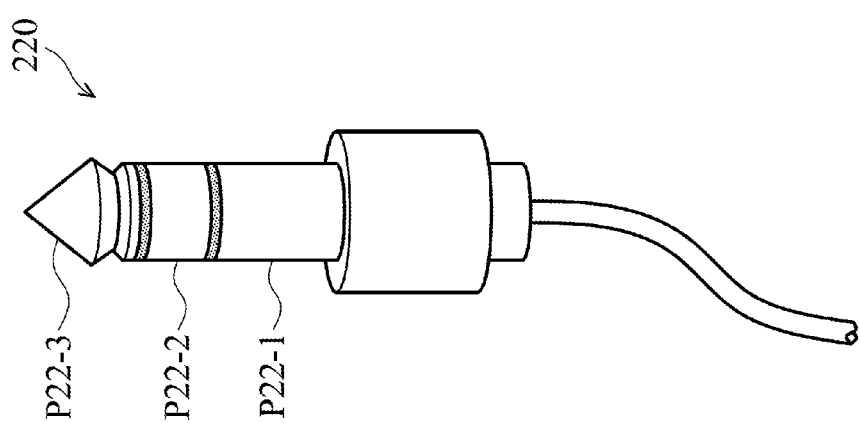
FIG. 2A is a schematic diagram illustrating an embodiment of a first-interface plug of an exemplary embodiment.

The shared socket 102 has a slot, a reference terminal P02_1, a control terminal P02_2, a signal receiving terminal P02_3 and a signal outputting terminal P02_4. It should be noted that the slot of the shared socket 102 is capable of accommodating plugs of different interfaces (a first-interface plug and a second-interface plug). In one embodiment, the slot of the shared socket 102 can be a columnar slot or a square slot capable of receiving plugs having a columnar shape or a square shape, respectively. As shown in FIG. 2A and FIG. 2B, the first-interface plug 220 and the second-interface plug 240 are columnar plugs. The first-interface plug 220 has three plug pins P22_1~P22_3, in which the plug pin P22_1 is arranged to be connected with the reference terminal P02_1 and the control terminal P02_2 of the shared socket 102, the plug pin P22_2 is arranged to be connected with the signal receiving terminal P02_3 of the shared socket 102, and the plug pin P22_3 is arranged to be connected with the signal outputting terminal P02_4 of the shared socket 102. Namely, when the first-interface plug 220 is plugged into the slot of the shared socket 102, the reference terminal P02_1 of the shared socket 102 is coupled to the control terminal P02_2 of the shared socket 102, that is, the plug pin P22_1 of the first-interface plug 220 is arranged to be coupled with a ground GND of the shared interface circuit 100, the plug pin P22_2 is arranged to transmit an external first-interface signal to the signal receiving terminal P02_3 of the shared socket 102, and the plug pin P22_3 is arranged to receive the power source provided by the power supply circuit 108 of the shared interface circuit 100. The second-interface plug 240 has four plug pins P24_1~P24_4, in which the plug pin P24_1 is arranged to be connected with the reference terminal P02_1 of the shared socket 102, the plug pin P24_2 is arranged to be connected with the control terminal P02_2 of the shared socket 102, the plug pin P24_3 is arranged to be connected with the signal receiving terminal P02_3 of the shared socket 102, and the plug pin P24_44 is arranged to be connected with the signal outputting terminal P02_4 of the shared socket 102. More specifically, the plug pin P24_1 of the second-interface plug 240 is connected to the ground GND of the shared interface circuit 100. The plug pin P24_2 is undefined (a not connected pin), the plug pin P24_3 is arranged to transmit the second-interface signal (second interface input signal RS232_IN) to the signal receiving terminal P02_3 of the shared socket 102, and the plug pin P24_4 is arranged to receive the second-interface signal (second interface output signal RS232_OUT) transmitted by the shared interface circuit 100. It should be noted that, in one embodiment, the first interface signal transmitted by the first-interface plug 220 can be an infrared detection signal. Moreover, signals transmitted and received by the second-interface plug 240 meet the specifications of the RS-232 interface, but it is not limited thereto. The first-interface plug 220 and the second-interface plug 240 can also transmit and receive signals of other interfaces.

It should be noted that, when the first-interface plug 220 is plugged into the slot, the shared interface circuit 100 is operated in a first interface mode. When the second-interface plug 240 is plugged into the slot, the shared interface circuit 100 is operated in a second interface mode. When no plugs are plugged into the slot, the shared interface circuit 100 is operated in a default interface mode.

The multiplexer 104 has a first input terminal P04_1, a second input terminal P04_2 and a third input terminal P04_3. The first input terminal P04_1 is selectively coupled to a first-interface pin CPU_IR of a processor 112 according to the control signal CNTL, the second input terminal P04_2 is selectively coupled to a second-interface transfer pin CPU_TX of the processor 112 according to the control signal CNTL, and the third input terminal P04_3 is selectively coupled to a second-interface receive pin CPU_RX and a first-interface pin CPU_IR of the processor 112 according to the control signal CNTL. More specifically, in the first interface mode, the first input terminal P04_1 and the second input terminal P04_2 of the multiplexer 104 are open circuits. The third input terminal P04_3 of the multiplexer 104 receives the external first-interface signal IR_EX from the switch circuit 110 and transmits the external first-interface signal to the first-interface pin CPU_IR of the processor 112. Moreover, in the second interface mode, the first input terminal P04_1 of the multiplexer 104 receives the internal first-interface signal IR_IN from the first node N1 and transmits the internal first-interface signal IR_IN to the first-interface pin CPU_IR of the processor 112. The second input terminal P04_2 of the multiplexer 104 receives the second interface input signal RS232_IN from the second-interface transfer pin CPU_TX of the processor 112 and transmits the second interface input signal RS232_IN to the level shifter circuit 106. The third input terminal P04_3 of the multiplexer 104 receives the converted second interface input signal RS232_IN from the level shifter circuit 106, and transmits the converted second interface input signal RS232_IN to the second-interface receive pin CPU_RX of the processor 112. Moreover, in the default interface mode, the first input terminal P04_1 of the multiplexer 104 is an open circuit. The first input terminal P04_1 and the third input terminal P04_3 of the multiplexer 104 are coupled to the first-interface pin CPU_IR of the processor 112 for transmitting the internal first-interface signal IR_IN to the first-interface pin CPU_IR of the processor 112. As described above, the multiplexer 104 can transmit the internal first-interface signal IR_IN to the first-interface pin CPU_IR of the processor 112 by different input terminals in the default interface mode and the second interface mode. In the first interface mode, the multiplexer 104 stops transmitting the internal first-interface signal IR_IN to the first-interface pin CPU_IR of the processor 112 and transmits the external first-interface signal IR_EX transmitted by the first-interface plug 220 to the first-interface pin CPU_IR of the processor 112.

The level shifter circuit 106 is arranged to convert the signals on the second input terminal P04_2 of the multiplexer 104 form a first voltage level to a second voltage level and convert the signals on the signal receiving terminal P02_3 of the shared socket 102 from the second voltage level to the first voltage level. The level shifter circuit 106 is further arranged to selectively transmit the converted signals on the second input terminal P04_2 of the multiplexer 104 to the signal outputting terminal P02_4 of the shared socket 102 according to the control signal CNTL, and selectively transmit the converted signals on the signal receiving terminal P02_3 of the shared socket 102 to the third input terminal P04_3 of the multiplexer 104 according to the control signal CNTL. More specifically, in the first interface mode, the level shifter circuit 106 is an open circuit. In the second interface mode, the level shifter circuit 106 receives a second interface output signal RS232_OUT from the processor 104, converts the second interface output signal RS232_OUT from a first voltage level to a second voltage level, and transmits the converted second interface output signal RS232_OUT to the signal outputting terminal P02_4 of the shared socket 102. Moreover, in the second interface mode, the level shifter circuit 106 is further arranged to receive a second interface input signal RS232_IN from the signal receiving terminal P02_3 of the shared socket 102, convert the second interface input signal RS232_IN from the second voltage level to the first voltage level, and transmits the converted second interface input signal RS232_IN to the shared socket 102. Moreover, in the default interface mode, the level shifter circuit 106 is an open circuit. It should be noted that the first voltage level satisfies the requirement of the voltage level of the specifications of the first interface, and the second voltage level satisfies the requirement of the voltage level of the specifications of the second interface. In one embodiment, the first interface is an infrared transmission interface, in which the high level is 3.3 volt, and the low level is 0 volt, but it is not limited thereto. In one embodiment of the present invention, the second interface is a RS232 interface, in which the level of logic high is between −5 and −15 volt and the level of logic low is between 5-15 volt, but it is not limited thereto. In other words, the logic "1" of the second interface is between −5~−15 volt, and the logic "0" of the second interface is between 5~15 volt.

The power supply circuit 108 selectively couples a first power source V1 with the signal outputting terminal P02_4 according to the control signal CNTL. More specifically, in the first interface mode, the power supply circuit 108 provides a first power source V1 to the signal outputting terminal P02_4 of the shared socket 102. In the second interface mode, the power supply circuit 108 stops providing the first power source V1 to the signal outputting terminal P02_4 of the shared socket 102. Moreover, in the default interface mode, the power supply circuit 108 provides the first power source V1 to the signal outputting terminal P02_4. It should be noted that the first power source V1 is the power supply for the first-interface plug 220. Therefore, the first power source V1 has to meet the specifications of the first interface. In one embodiment, the first-interface plug 220 is the plug of the external IR receiver, and the power requirement of the external IR receiver is 5 volt. Therefore, the first power source V1 is 5 volt, but it is not limited thereto.

The switch circuit 110 is selectively coupled the signal receiving terminal P02_3 of the shared socket 102 to the third input terminal P04_3 of the multiplexer 104 according to the control signal CNTL. More specifically, in the first interface mode, the switch circuit 110 receives a first interface signal from the signal receiving terminal P02_3 of the shared socket 102. In the second interface mode, the switch circuit 110 is an open circuit. Furthermore, in the default interface mode, the switch circuit 110 receives the internal first-interface signal IR_IN from the first switch SW1, and transmits the internal first-interface signal IR_IN to the third input terminal P04_3 of the multiplexer 104.

In one embodiment, the control signal CNTL is generated by the control terminal P02_2 of the shared socket 102. The control terminal P02_2 of the shared socket 102 generates the control signal CNTL with a first level when no plugs are plugged into the slot, the control terminal P02_2 of the shared socket 102 generates the control signal CNTL with the first level when a first-interface plug 220 is plugged into the slot, and the control terminal P02_2 of the shared socket 102 generates the control signal CNTL with a second level when a second-interface plug 240 is plugged into the slot. The reference terminal P02_1 of the shared socket 102 is coupled with the control terminal P02_2 of the shared socket 102 when no plugs are plugged into the slot or the first-interface plug 220 is plugged into the slot, and the reference terminal P02_1 of the shared socket 102 is decoupled from the control terminal P02_2 of the shared socket 102 when the second-interface plug 240 is plugged into the slot. More specifically, the first level is the low level (GND) representing the logic 0, and the second level is the high level representing the logic 1. In one embodiment, the control terminal P02_2 of the shared socket 102 can be coupled to a power source (not shown) through a resistor for producing the control signal CNTL with the high level when the second-interface plug 240 is plugged into the slot. When no plugs are plugged into the slot or the first-interface plug 220 is plugged into the slot, the ground GND of the reference terminal P02_1 of the shared socket 102 is connected to the control terminal P02_2 of the shared socket 102, such that the control terminal P02_2 produces the control signal CNTL with the low level. More specifically, the reference terminal P02_1 of the shared socket 102 and the control terminal P02_2 of shared socket 102 are coupled to the ground GND. When the second-interface plug 240 is plugged into the slot, the control terminal P02_2 of the shared socket 102 is decoupled from the reference terminal P02_1. Therefore, the voltage source of control terminal P02_2 may produce the control signal CNTL with the high level on the control terminal P02_2 of the shared socket 102.

The first-interface-signal generator 114 generates an internal first-interface signal IR_IN, and provides the internal first-interface signal IR_IN to a first node N1. The first node N1 is coupled to the first input terminal P04_1 of the multiplexer 104. It should be noted that, in one embodiment, the internal first-interface signal IR_IN is an IR detecting signal, but it is not limited thereto.

The first switch SW1 selectively couples the first node N1 of the multiplexer 104 to the third input terminal P04_3 depending on whether any plug is plugged into the slot. More specifically, in the first interface mode and the second interface mode, the first switch SW1 is arranged to enable the internal first-interface signal IR_IN to be transmitted to the first input terminal P04_1 of the multiplexer 104. Moreover, in the default interface mode, the first switch SW1 is arranged to enable the internal first-interface signal IR_IN to be transmitted to a third input terminal P04_3 of the multiplexer 104. In one embodiment, the first switch SW1 can be a mechanical device implemented in the shared socket 102, such as shrapnel, but it is not limited thereto. The first switch SW1 decouples the first node from the switch circuit 110 when any of the first-interface plug 220 or the second-interface plug 240 is plugged into the slot. In other embodiments, the first switch SW1 operates depending on the signal produced by a mechanical device implemented in the shared socket 102.

The first switch SW1 couples the first node N1 to the third input terminal P04_3 of the multiplexer 104 when no plugs are plugged into the slot, the first switch SW1 decouples the first node N1 from the third input terminal P04_3 of the multiplexer 104 when the first-interface plug 220 or the second-interface plug 240 is plugged into the slot.

Figure 3:
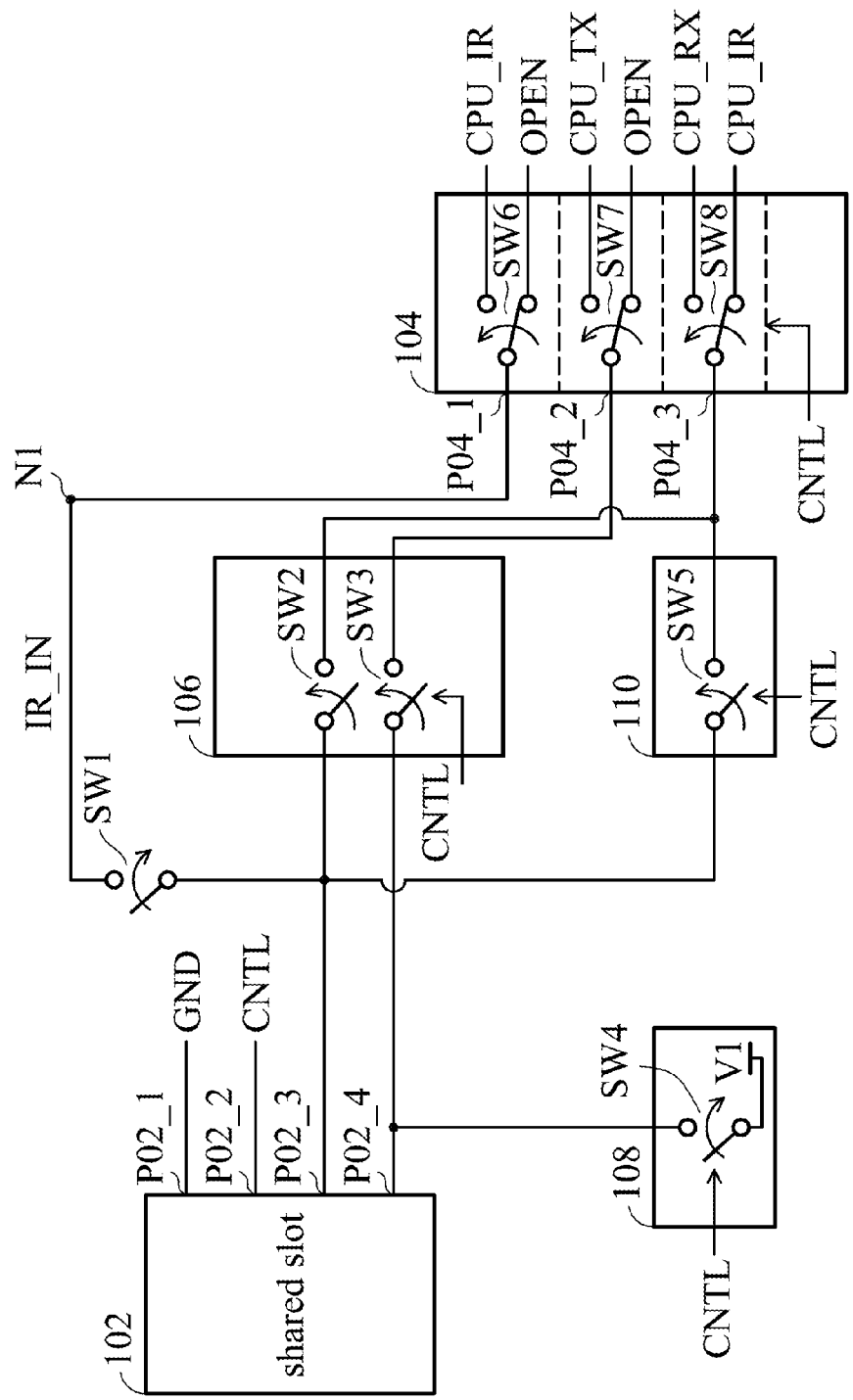
FIG. 3 is a schematic diagram illustrating an embodiment of a shared interface circuit of an exemplary embodiment.

FIG. 3 is a schematic diagram illustrating an embodiment of a shared interface circuit of an exemplary embodiment. More specifically, the shared interface circuit 100 of FIG. 3 is equal to the shared interface circuit 100 of FIG. 1. Based on the description of FIG. 1, the multiplexer 104 has three switches SW6~SW8, the level shifter circuit 106 has two switches SW2~SW3, the power supply circuit 108 has one switch SW4, the switch circuit 110 has one switch SW5. The switch SW6 of the multiplexer 104 selectively couples the first input terminal P04_1 to the first-interface pin CPU_IR of the processor 112 or opens the first input terminal P04_1 according to the control signal CNTL. The switch SW7 of the multiplexer 104 selectively couples the second input terminal P04_2 to the second-interface transfer pin CPU_TX of the processor 112 or opens the second input terminal P04_2 according to the control signal CNTL. The switch SW8 of the multiplexer 104 selectively couples the third input terminal P04_3 to the second-interface receive pin CPU_RX or the first-interface pin CPU_IR of the processor 112 according to the control signal CNTL. The switch SW2 of the level shifter circuit 106 selectively couples the signal receiving terminal P02_3 of the shared socket 102 to the third input terminal P04_3 of the multiplexer 104 according to the control signal CNTL. The switch SW3 of the level shifter circuit 106 selectively couples the control terminal P04_2 of the multiplexer 104 to the signal outputting terminal P02_4 of the shared socket 102 according to the control signal CNTL. The switch SW4 of the power supply circuit 108 selectively couples the first power source V1 to the signal outputting terminal P02_4 according to the control signal CNTL. The switch SW5 of the switch circuit 110 selectively couples the signal receiving terminal P02_3 of the shared socket 102 to the third input terminal P04_3 of the multiplexer 104 according to the control signal CNTL.

Figure 4:
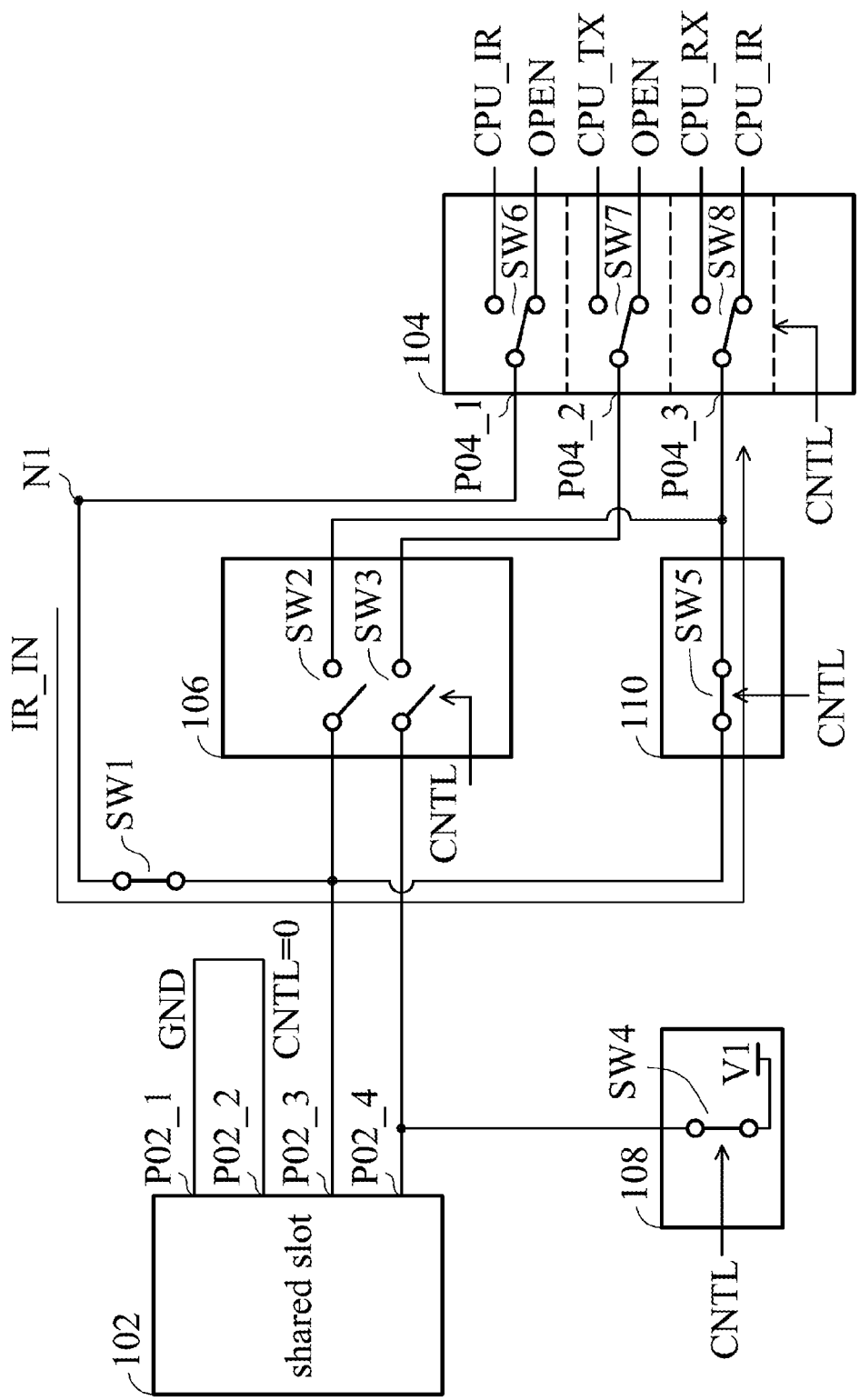
FIG. 4 is a schematic diagram illustrating an embodiment of unplugged into the shared interface circuit of an exemplary embodiment.

FIG. 4 is a schematic diagram illustrating an embodiment of unplugged into the shared interface circuit of an exemplary embodiment. More specifically, FIG. 4 shows the embodiment of the shared interface circuit 100 of FIG. 3 that no plugs are plugged into the shared interface circuit 100. In FIG. 4, the first switch SW1 couples the first node N1 to the third input terminal P04_3 of the multiplexer 104 and the control terminal P02_2 of the shared socket is coupled to the ground GND of the reference terminal P02_1, because no plugs are plugged into the shared socket 102. The control terminal P02_2 of the shared socket is coupled to the ground GND of the reference terminal P02_1, such that the control signal CNTL is at the first level. When the control signal CNTL is at the first level, the switch SW6 of the multiplexer 104 enables the first input terminal P04_1 to be an open circuit, the switch SW7 of the multiplexer 104 enables the second input terminal P04_2 to be an open circuit, and the switch SW8 of the multiplexer 104 enables the third input terminal P04_3 to be coupled to the first-interface pin CPU_IR of the processor 112. The switch SW3 of the level shifter circuit 106 decouples the second input terminal P04_2 of the multiplexer 104 from the signal outputting terminal P02_4 of the shared socket 102, the switch SW2 of the level shifter circuit 106 decouples the signal receiving terminal P02_3 of the shared socket 102 from the third input terminal P04_3 of the multiplexer 104, the switch SW4 of the power supply circuit 108 is coupled to the signal outputting terminal P02_4 of the first power source V1, and the switch SW5 of the switch circuit 110 couples the signal receiving terminal P02_3 of the shared socket 102 to the third input terminal P04_3 of the multiplexer 104. As described above, when no plugs are plugged into the shared socket 102, the internal first-interface signal IR_IN produced by first-interface-signal generator 114 on the first node N1 is provided to the first-interface pin CPU_IR of the processor 112 through the first switch SW1 and the switch SW5 of the switch circuit 110.

Figure 5:
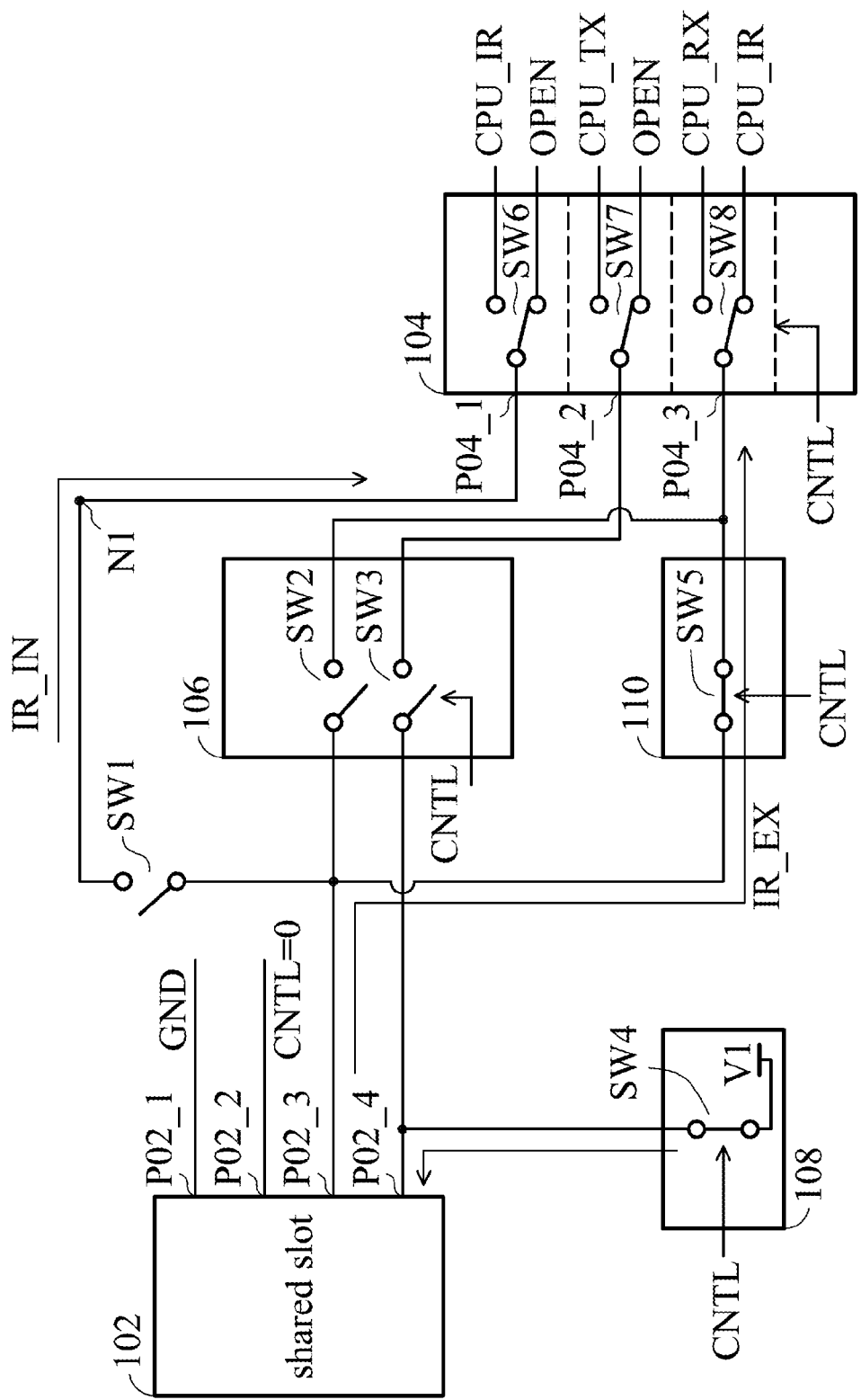
FIG. 5 is a schematic diagram illustrating an embodiment of a first-interface plug plugged into the shared interface circuit of an exemplary embodiment.

FIG. 5 is a schematic diagram illustrating an embodiment of a first-interface plug plugged into the shared interface circuit of an exemplary embodiment. More specifically, FIG. 5 shows the embodiment of the shared interface circuit 100 of FIG. 3 in which the first-interface plug 220 is plugged into the shared socket 102 of the shared interface circuit 100. In FIG. 5, the first-interface plug 220 is plugged into the slot, such that the first switch SW1 decouples the first node N1 from the third input terminal P04_3 of the multiplexer 104, and the control terminal P02_2 of the shared socket is coupled to the ground GND of the reference terminal P02_1. The control terminal P02_2 of the shared socket is coupled to the ground GND of the reference terminal P02_1, such that the control signal CNTL is at the first level. When the control signal CNTL is at the first level, the switch SW6 of the multiplexer 104 enables the first input terminal P04_1 to be an open circuit, the switch SW7 of the multiplexer 104 enables the second input terminal P04_2 to be an open circuit, the switch SW8 of the multiplexer 104 enables the third input terminal P04_3 to be coupled to the first-interface pin CPU_IR of the processor 112, the switch SW3 of the level shifter circuit 106 decouples the control terminal P02_2 of the multiplexer 104 from the signal outputting terminal P02_4 of the shared socket 102, the switch SW2 of the level shifter circuit 106 decouples the signal receiving terminal P02_3 of the shared socket 102 from the third input terminal P04_3 of the multiplexer 104, the switch SW4 of the power supply circuit 108 couples the first power source V1 to the signal outputting terminal P02_4, and the switch SW5 of the switch circuit 110 couples the signal receiving terminal P02_3 of the shared socket 102 to the third input terminal P04_3 of the multiplexer 104. As described above, when the first-interface plug 220 is plugged into the shared socket 102, the internal first-interface signal IR_IN produced by the first-interface-signal generator 114 on the first node N1 stops being transmitted to the internal first-interface signal IR_IN through the switch SW6 of the multiplexer 104, and the external first-interface signal IR_EX provided by the plug pin P22_2 of the first-interface plug 220 is transmitted to the first-interface pin CPU_IR of the processor 112 through the signal receiving terminal P02_3 of the shared socket 102, the switch SW5 of the switch circuit 110 and the switch SW8 of the multiplexer 104.

Figure 6:
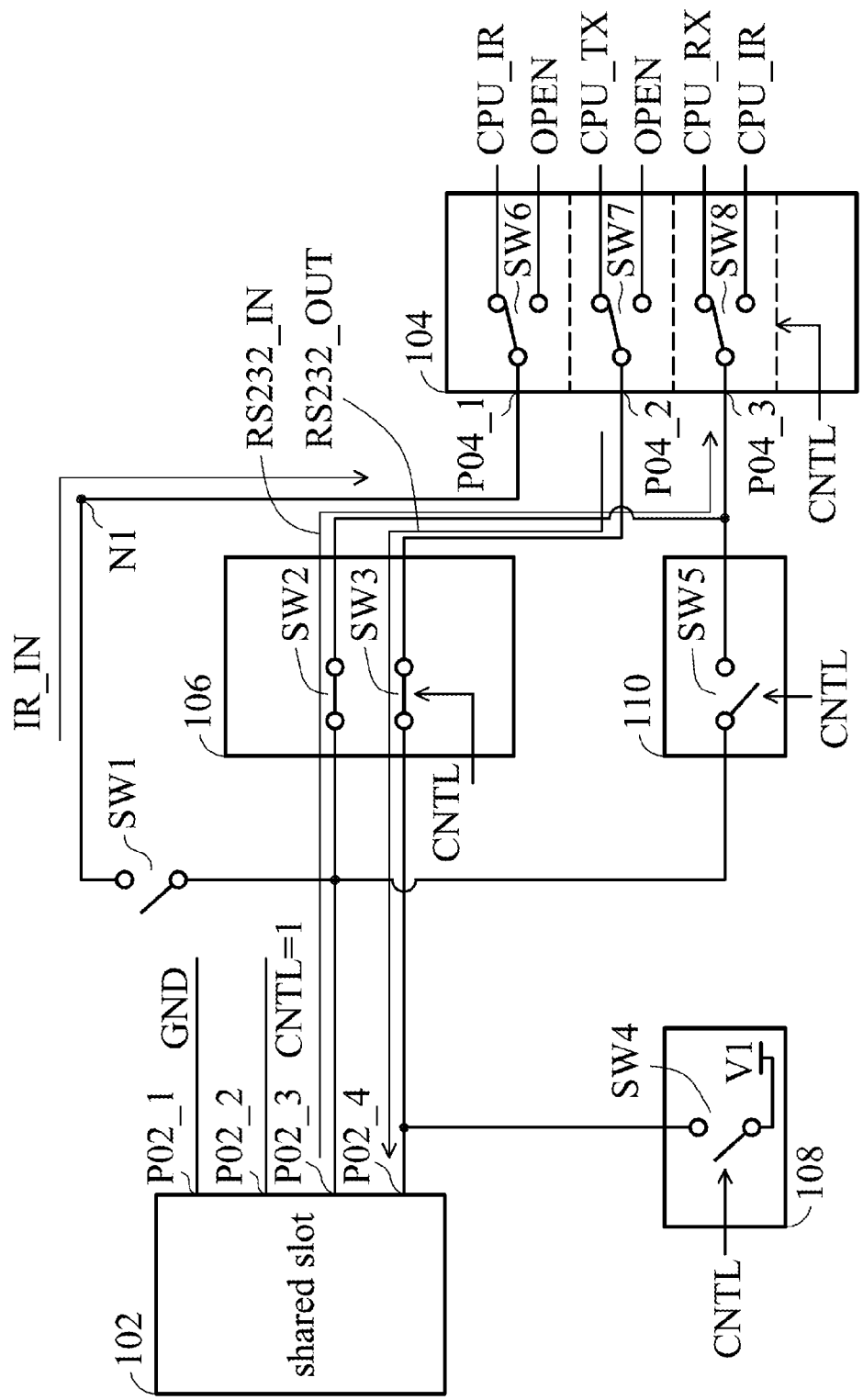
FIG. 6 is a schematic diagram illustrating an embodiment of a second-interface plug plugged into the shared interface circuit of an exemplary embodiment.

FIG. 6 is a schematic diagram illustrating an embodiment of a second-interface plug plugged into the shared interface circuit of an exemplary embodiment. More specifically, FIG. 6 shows the embodiment of the shared interface circuit 100 of FIG. 3 in which the second-interface plug 240 is plugged into the shared socket 102 of the shared interface circuit 100. In FIG. 6, the second-interface plug 240 is plugged into the slot, such that the first switch SW1 decouples the first node N1 from the third input terminal P04_3 of the multiplexer 104 and the control terminal P02_2 of the shared socket is floating. The control terminal P02_2 of the shared socket is floating, such that the control signal CNTL is at the second level. When the control signal CNTL is the second level, the switch SW6 of the multiplexer 104 enables the first input terminal P04_1 to be coupled to the first-interface pin CPU_IR of the processor 112, the switch SW7 of the multiplexer 104 enables the second input terminal P04_2 to be coupled to the second-interface transfer pin CPU_TX of the processor 112, the switch SW8 of the multiplexer 104 enables the third input terminal P04_3 to be coupled to the second-interface receive pin CPU_RX of the processor 112, the switch SW3 of the level shifter circuit 106 transmits the converted signals on the control terminal P02_2 of the multiplexer 104 to the signal outputting terminal P02_4 of the shared socket 102, the switch SW2 of the level shifter circuit 106 transits the converted signals on the signal receiving terminal P02_3 of the shared socket 102 to the third input terminal P04_3 of the multiplexer 104, the switch SW4 of the power supply circuit 108 decouples the first power source V1 from the signal outputting terminal P02_4, the switch SW5 of the switch circuit 110 decouples the signal receiving terminal P02_3 of the shared socket 102 from the third input terminal P04_3 of the multiplexer 104. As described above, when the second-interface plug 240 is plugged into the shared socket 102, the internal first-interface signal IR_IN produced by the first-interface-signal generator 114 on the first node N1 is transmitted to the first-interface pin CPU_IR of the processor 112 through the switch SW6 of the multiplexer 104, and the second interface input signal RS232_IN provided by the plug pin P24_3 of the second-interface plug 240 is transmitted to the second-interface receive pin CPU_RX of the processor 112 through the signal receiving terminal P02_3 of the shared socket 102, the switch SW2 of the level shifter circuit 106 and the switch SW8 of the multiplexer 104, and the second interface output signal RS232_OUT provided by the second-interface transfer pin CPU_TX of the processor 112 is transmitted to the plug pin P24_4 of the second-interface plug 240 through the switch SW7 of the multiplexer 104, the switch SW3 of the level shifter circuit 106 and the signal outputting terminal P02_4 of the shared socket 102. It should be noted that the internal first-interface signal IR_IN and the external first-interface signal IR_EX are the same interface signal. In one embodiment, the internal first-interface signal IR_IN and the external first-interface signal IR_EX are the IR detected signals arranged to detect infrared signals, but it is not limited thereto. The internal first-interface signal IR_IN and the external first-interface signal IR_EX can be other interface signals, such as Bluetooth signals. Moreover, in one embodiment, the second interface output signal RS232_OUT and the second interface input signal RS232_IN meet the specifications of the RS232 interface, but it is not limited thereto. The second interface output signal RS232_OUT and the second interface input signal RS232_IN can also meet the other interfaces, such as USB, etc.

In other words, while referring back to FIG. 1 and FIG. 2, the shared interface circuit 100 is applicable to a first-interface plug 220 and a second-interface plug 240 meeting a first interface specification and a second interface specification, respectively. The shared interface circuit 100 includes a shared socket 102, a level shifter circuit 106, a multiplexer 104, a power supply circuit 108, a switch circuit 110, a processor 112, a first switch SW1, a first node N1, and a first-interface-signal generator 114.

The shared socket 102 has a slot, a control terminal P02_2, a reference terminal P02_1, a signal receiving terminal P02_3, and a signal outputting terminal P02_4. The control terminal P02_2 is electrically connected to the reference terminal P02_1 when the first-interface plug 220 is inserted into the slot, and the control terminal P02_2 is electrically separated with the reference terminal P02_1 when the second-interface plug 240 is inserted into the slot, in which a control signal CNTL is generated by the voltage differences between the reference terminal P02_1 and the control terminal P02_2. The signal receiving terminal P02_3 generates an input signal, where the input signal can be the external first-interface signal IR_EX or the second interface input signal RS232_IN. The signal outputting terminal P02_4 receives the first power source V1 from the power supply circuit 108 according to the control signal CNTL when the first-interface plug 220 is inserted into the slot, and the signal outputting terminal P02_4 stops receiving the first power source V1 from the power supply circuit 108 according to the control signal CNTL when the second-interface plug 240 is inserted into the slot. When the second-interface plug 240 is inserted into the slot, an output signal (the second interface output signal RS232_OUT) is transmitted from the multiplexer 104, converted by the level shifter circuit 106, and then provided to the signal outputting terminal P02_4 according to the control signal CNTL.

The level shifter circuit 106 is coupled to the shared socket 102 and is adapted to be operated for converting the input signal to another voltage level according to the control signal CNTL.

The multiplexer 104 is coupled to the level shifter circuit 106, receiving the converted input signal and being operated according to the control signal CNTL.

The power supply circuit 108 is coupled to the shared socket 102, the power supply selectively providing a first power source V1 to the signal receiving terminal P02_3 according to the control signal CNTL.

The switch circuit 110 is coupled between the shared socket 102 and the multiplexer 104 and is operated according to the control signal CNTL. The switch circuit 110 receives the input signal from the shared socket 102 and transmits the input signal to the multiplexer 104 when the first-interface plug 220 is inserted into the slot.

The processor 112 is coupled to the multiplexer 104. The processor 112 has a plurality of input terminals connected to the multiplexer 104. The converted signal is selectively transmitted to one of the input terminal via the multiplexer 104 according to the control signal CNTL.

The first switch SW1 is coupled to the shared socket 102 and the level shifter circuit 106 and being operated according to the control signal CNTL, in which the first switch SW1 is normally closed when no plug is inserted into the slot of the shared socket 102, and is opened when the first-interface plug 220 or the second-interface plug 240 is inserted into the slot of the shared socket 102.

The first node N1 is coupled to the multiplexer 104, the shared socket 102 and the level shifter circuit 106, in which the first node N1 is coupled to the shared socket 102 and the level shifter circuit 106 via the first switch SW1.

The first-interface-signal generator 114 is coupled to the first node N1 and the first switch SW1, and producing an internal first-interface signal IR_IN to the first node N1. The internal first-interface signal IR_IN is transmitted to the multiplexer 104 when the first switch SW1 is opened, and is transmitted to the multiplexer 104 through the switch circuit 110 when the first switch SW1 is closed.

Figure 7:
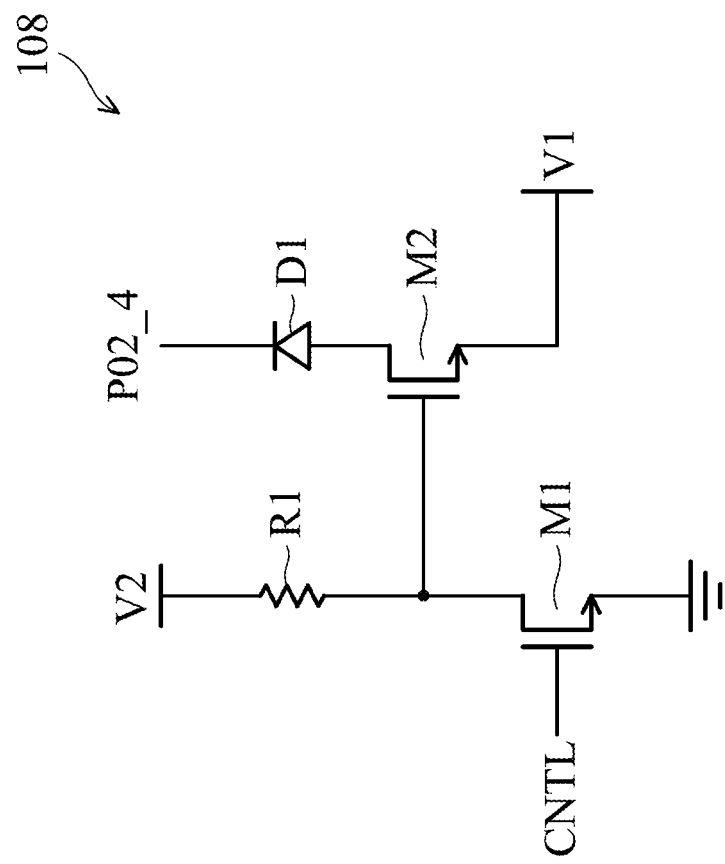
FIG. 7 is a schematic diagram illustrating an embodiment of a power supply circuit of an exemplary embodiment.

FIG. 7 is a schematic diagram illustrating an embodiment of a power supply circuit of an exemplary embodiment. The power supply circuit 108 further includes a first N-type field effect transistor M1, a first resistor R1, a second N-type field effect transistor M2 and a first diode D1. The first N-type field effect transistor M1 has a gate terminal arranged to receive the control signal CNTL, a source terminal coupled to the ground, and a drain terminal, but it is not limited thereto. The first resistor R1 has a first terminal coupled to a second power source V2, and a second terminal coupled to the drain terminal of the first N-type field effect transistor M1. The second N-type field effect transistor M2 has a gate terminal coupled to the drain terminal of the first N-type field effect transistor M1, a source terminal coupled to the first power source V1, and a drain terminal. The first diode D1 has a positive input terminal coupled to the drain terminal of the second N-type field effect transistor M2, and a negative input terminal coupled to the signal outputting terminal P02_4 of the shared socket 102. It should be noted that the first power source V1 is the power supply of the first-interface plug 220. Therefore, the first power source V1 has to meet the specifications of the first interface. In one embodiment, the first-interface plug 220 is the plug of the external IR receiver, and the power requirement of the external IR receiver is 5 volt. Therefore, the first power source V1 is 5 volt, but it is not limited thereto. Moreover, the circuit designer may design the value of the second power source V2 according to the characteristic of the first N-type field effect transistor M1 and the second N-type field effect transistor M2. In one embodiment, the second power source V2 is 12 volt, but it is not limited thereto.

Figure 8:
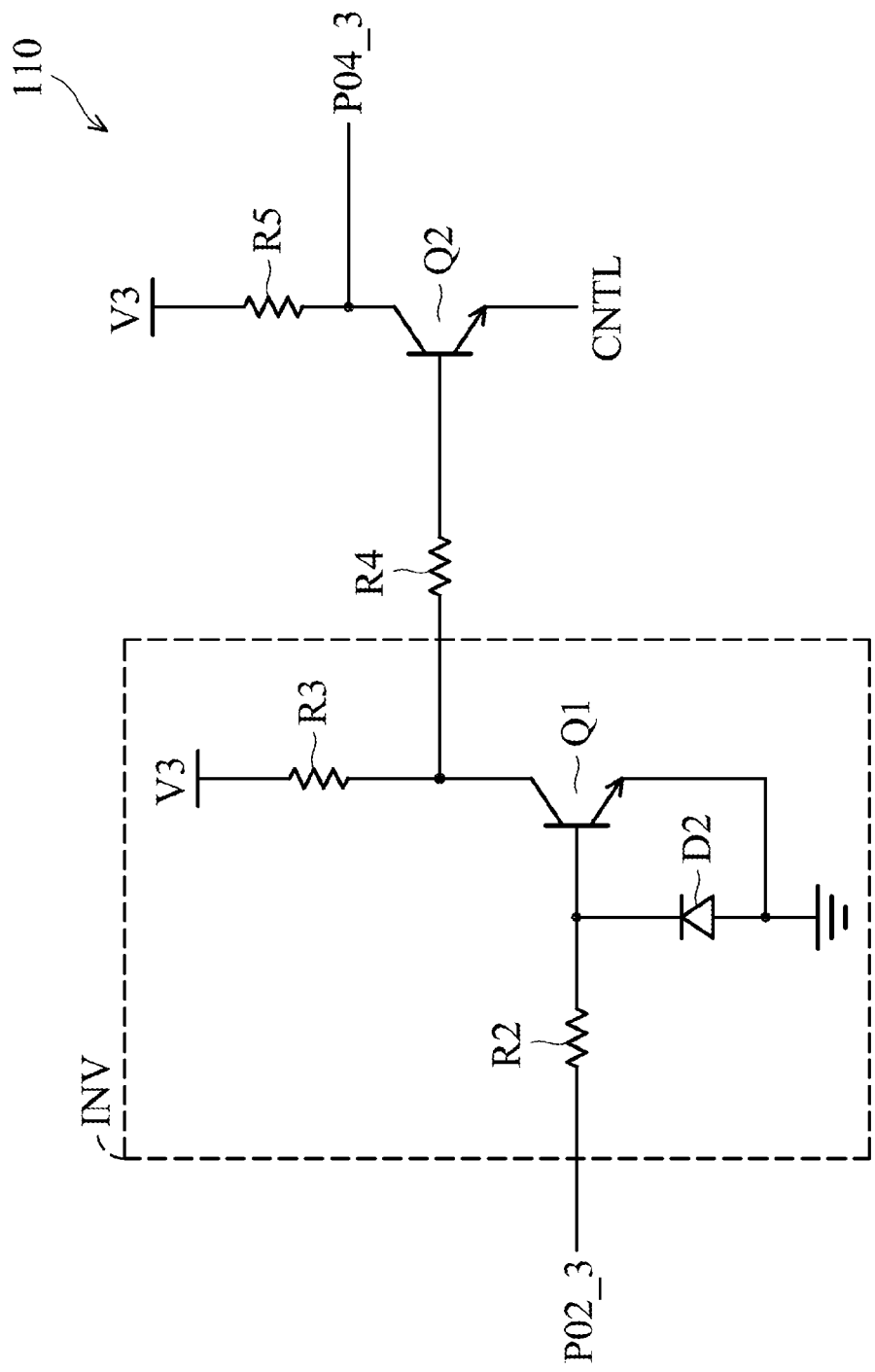
FIG. 8 is a schematic diagram illustrating an embodiment of a switch circuit of an exemplary embodiment.

FIG. 8 is a schematic diagram illustrating an embodiment of a switch circuit of an exemplary embodiment. As shown in FIG. 8, the switch circuit 110 further includes an inverter INV. More specifically, the switch circuit 110 further includes a second resistor R2, a second diode D2, a first NPN bipolar transistor Q1, a third resistor R3, a fourth resistor R4, a second NPN bipolar transistor Q2 and a fifth resistor R5, but it is not limited thereto. The second resistor R2 has a first terminal coupled to the signal receiving terminal P02_3 of the shared socket 102, and a second terminal. The second diode D2 has a positive input terminal coupled to the ground, and a negative input terminal coupled to the second terminal of the second resistor R2. The first NPN bipolar transistor Q1 has a base terminal coupled to the second terminal of the second resistor R2, an emitter terminal coupled to the positive input terminal of the second diode D2, and a collector terminal. The third resistor R3 has a first terminal coupled to a third power source V3 having the first voltage level, and a second terminal coupled to the collector terminal of the first NPN bipolar transistor Q1. The fourth resistor R4 has a first terminal coupled to the collector terminal of the first NPN bipolar transistor Q1, and a second terminal. The second NPN bipolar transistor Q2 has a base terminal coupled to the second terminal of the fourth resistor R4, an emitter terminal arranged to receive the control signal CNTL, and a collector terminal coupled to the third input terminal P04_3 of the multiplexer 104. The fifth resistor R5 has a first terminal coupled to the third power source V3, and a second terminal coupled to the collector terminal of the second NPN bipolar transistor Q2. The fifth resistor R5, the second NPN bipolar transistor Q2 and the fourth resistor R4 constitute a switch. However, the signals pass through the switch constituted by the fifth resistor R5, the second NPN bipolar transistor Q2 and the fourth resistor R4 will be inverted. Therefore, the switch circuit 110 inverts the signals before the signal is input to the switch constituted by the fifth resistor R5, the second NPN bipolar transistor Q2 and the fourth resistor R4 by the inverter INV, such that the third input terminal P04_3 arranged to be input to the multiplexer 104 will be correct. It should be noted that the first voltage level satisfies the requirements of the voltage level of the specifications of the first interface. In one embodiment, the first interface is an infrared transmission interface, wherein the high level is 3.3 volt, and the low level is 0 volt, but it is not limited thereto. Therefore, in this embodiment, the first voltage level is 3.3 volt. Moreover, the second voltage level satisfies the requirement of the voltage level of the specifications of the second interface. In one embodiment of the present invention, the second interface is a RS232 interface, wherein the high level is between −5 and −15 volt and the low level is between 5~15 volt, but it is not limited thereto. Both the first interface signal and the second-interface signal are transmitted to the processor 112 through the multiplexer 104. Therefore, the second diode D2 of the inverter INV is arranged to prevent the damage of the first NPN bipolar transistor Q1 and the second NPN bipolar transistor Q2 from the negative voltage.

The shared interface circuit 100 of the present invention is capable of two interfaces having two different voltage specifications.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine such as a computer, the machine becomes an apparatus for practicing the disclosed methods. When implemented on a general-purpose processor, the program code combines with the processor to provide a unique apparatus that operates analogously to application-specific logic circuits.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A shared interface circuit, comprising:
    a shared socket, having a slot, a reference terminal, a control terminal, a signal receiving terminal and a signal outputting terminal;
    a multiplexer, having a first input terminal, a second input terminal and a third input terminal, wherein the first input terminal is arranged to be selectively coupled to a first-interface pin of a processor according to a control signal, the second input terminal is arranged to be selectively coupled to a second-interface transfer pin of the processor according to the control signal, and the third input terminal is arranged to be selectively coupled to a second-interface receive pin and the first-interface pin of the processor according to the control signal;
    a level shifter circuit, arranged to convert signals on the second input terminal of the multiplexer from a first voltage level to a second voltage level and convert signals on the signal receiving terminal of the shared socket from the second voltage level to the first voltage level, wherein the level shifter circuit is further arranged to selectively transmit the converted signals on the control terminal input terminal of the multiplexer to the signal outputting terminal of the shared socket according to the control signal, and selectively transmit the converted signals on the signal receiving terminal of the shared socket to the third input terminal of the multiplexer according to the control signal;

a power supply circuit arranged to selectively couple a first power source to the signal outputting terminal according to the control signal; and a switch circuit, arranged to selectively couple the signal receiving terminal of the shared socket to the third input terminal of the multiplexer according to the control signal.

2. The shared interface circuit as claimed in claim 1, wherein the control signal is generated by the control terminal of the shared socket.

3. The shared interface circuit as claimed in claim 2, wherein the control terminal of the shared socket generates the control signal with a first level when no plugs are plugged into the socket, the control terminal of the shared socket generates the control signal with the first level when a first-interface plug is plugged into the slot, and the control terminal of the shared socket generates the control signal with a second level when a second-interface plug is plugged into the slot.

4. The shared interface circuit as claimed in claim 3, wherein when no plugs are plugged into the slot and the first-interface plug is plugged into the slot, the reference terminal of the shared socket is coupled to the control terminal of the shared socket, and the reference terminal of the shared socket is decoupled from the control terminal of the shared socket when the second-interface plug is plugged into the slot.

5. The shared interface circuit as claimed in claim 3, further comprising:
   a first-interface-signal generator arranged to produce an internal first-interface signal and provide the internal first-interface signal to a first node, wherein the first node is coupled to the first input terminal of the multiplexer; and
   a first switch arranged to selectively couple the first node to the third input terminal of the multiplexer depending on whether any plug is plugged into the slot.

6. The shared interface circuit as claimed in claim 5, wherein the first switch couples the first node to the third input terminal of the multiplexer when no plugs are plugged into the slot, the first witch de-couples the first node from the third input terminal of the multiplexer when the first-interface plug is plugged into the slot or the second-interface plug is plugged into the slot.

7. The shared interface circuit as claimed in claim 6, wherein when the control signal is the first level, the first input terminal of the multiplexer is open, the second input terminal of the multiplexer is open, the third input terminal of the multiplexer is coupled to the first-interface pin of the processor, the level shifter circuit decouples the control terminal of the multiplexer from the signal outputting terminal of the shared socket, the level shifter circuit decouples the signal receiving terminal of the shared socket from the third input terminal of the multiplexer, the power supply circuit couples the first power source to the signal outputting terminal, and the switch circuit couples the signal receiving terminal of the shared socket to the third input terminal of the multiplexer.

8. The shared interface circuit as claimed in claim 6, wherein when the control signal is the second level, the first input terminal of the multiplexer is coupled to the first-interface pin of the processor, the second input terminal of the multiplexer is coupled to the second-interface transfer pin of the processor, the third input terminal of the multiplexer is coupled to the second-interface receive pin of the processor, the level shifter circuit transmits the converted signals on the control terminal of the multiplexer to the signal outputting terminal of the shared socket, the level shifter circuit transmits the converted signals on the signal receiving terminal of the shared socket to the third input terminal of the multiplexer, the power supply circuit decouples the first power source from the signal outputting terminal, and the switch circuit decouples the signal receiving terminal of the shared socket from the third input terminal of the multiplexer.

9. The shared interface circuit as claimed in claim 1, wherein the power supply circuit further comprises:
   a first N-type field effect transistor having a gate terminal arranged to receive the control signal, a source terminal coupled to the ground, and a drain terminal;
   a first resistor having a first terminal coupled to a second power source, and a second terminal coupled to the drain terminal of the first N-type field effect transistor;
   a second N-type field effect transistor having a gate terminal coupled to the drain terminal of the first N-type field effect transistor, a source terminal coupled to the first power source, and a drain terminal; and
   a first diode having a positive input terminal coupled to the drain terminal of the second N-type field effect transistor, and a negative input terminal coupled to the signal outputting terminal of the shared socket.

10. The shared interface circuit as claimed in claim 1, wherein the switch circuit further comprises an inverter.

11. The shared interface circuit as claimed in claim 1, wherein the switch circuit further comprises:
    a second resistor having a first terminal coupled to the signal receiving terminal of the shared socket, and a second terminal;
    a second diode having a positive input terminal coupled to the ground, and a negative input terminal coupled to the second terminal of the second resistor;
    a first NPN bipolar transistor having a base terminal coupled to the second terminal of the second resistor, an emitter terminal coupled to the positive input terminal of the second diode, and a collector terminal;
    a third resistor having a first terminal coupled to a third power source of the first voltage level, and a second terminal coupled to the collector terminal of the first NPN bipolar transistor;
    a fourth resistor having a first terminal coupled to the collector terminal of the first NPN bipolar transistor, and a second terminal;
    a second NPN bipolar transistor having a base terminal coupled to the second terminal of the fourth resistor, an emitter terminal arranged to receive the control signal, and a collector terminal coupled to the third input terminal of the multiplexer; and
    a fifth resistor having a first terminal coupled to the third power source, and a second terminal coupled to the collector terminal of the second NPN bipolar transistor.

12. A shared interface circuit applicable to a first-interface plug and a second interface plug meeting a first interface specification and a second interface specification, respectively, the shared interface circuit comprising:
    a shared socket having a slot, a control terminal, a reference terminal, and a signal receiving terminal generating an input signal, wherein the control terminal is electrically connected to the reference terminal when the first-interface plug is inserted into the slot, and the control terminal is electrically separated with the reference terminal when the second interface plug is inserted into the slot, wherein a control signal is generated by the voltage differences between the reference terminal and the control terminal;

a level shifter circuit coupled to the shared socket adapted to be operated for converting the input signal to another voltage level according to the control signal;

a multiplexer coupled to the level shifter circuit, receiving the converted input signal and being operated according to the control signal; and a processor coupled to the multiplexer, the processor having a plurality of input terminals connected to the multiplexer, wherein the converted signal is selectively transmitted to one of the input terminal via the multiplexer according to the control signal.

13. The shared interface circuit as claimed in claim 12, further comprising a power supply circuit coupled to the shared socket, the power supply selectively providing a first power source to the signal receiving terminal according to the control signal.

14. The shared interface circuit as claimed in claim 13, wherein the shared slot further comprises a signal outputting terminal receiving the first power source from the power supply circuit according to the control signal when the first-interface plug is inserted into the slot, and the signal outputting terminal stop receiving the first power source from the power supply circuit according to the control signal when the second-interface plug is inserted into the slot.

15. The shared interface circuit as claimed in claim 14, wherein when the second interface plug is inserted into the slot, an output signal is transmitted from the multiplexer, converted by the level shifter circuit, and then provided to a signal outputting terminal of the shared socket according to the control signal.

16. The shared interface circuit as claimed in claim 12, further comprising a switch circuit coupled between the shared socket and the multiplexer, the switch circuit being operated according to the control signal, wherein the switch circuit receives the input signal from the shared socket and transmits the input signal to the multiplexer when the first-interface plug is inserted into the slot.

17. The shared interface circuit as claimed in claim 16, further comprising:

a first switch coupled to the shared socket and the level shifter circuit and being operated according to the control signal, wherein the first switch is normally closed when no plug is inserted into the slot of the shared socket, and is opened when the first-interface plug or the second-interface plug is inserted into the slot of the shared socket;

a first node coupled to the multiplexer, the shared socket and the level shifter circuit, wherein the first node is coupled to the shared socket and the level shifter circuit via the first switch; and a first-interface-signal generator coupled to the first node and the first switch, and producing an internal first-interface signal to the first node, wherein the internal first-interface signal is transmitted to the multiplexer when the first switch is opened, and is transmitted to the multiplexer through the switch circuit when the first switch is closed.

\* \* \* \* \*